United States Patent
Schröder et al.

(10) Patent No.: US 12,068,638 B2
(45) Date of Patent: Aug. 20, 2024

(54) ROTOR, ELECTRIC MOTOR, METHOD FOR PRODUCING A ROTOR AND USE OF A ROTOR AND ELECTRIC MOTOR

(71) Applicant: thyssenkrupp AG, Essen (DE)

(72) Inventors: Mathias Schröder, Chemnitz (DE); Roland Buol, Wangs (CH)

(73) Assignee: thyssenkrupp AG, Essen (DE)

( * ) Notice: Subject to any disclaimer, the term of this patent is extended or adjusted under 35 U.S.C. 154(b) by 484 days.

(21) Appl. No.: 17/261,225

(22) PCT Filed: Jul. 19, 2019

(86) PCT No.: PCT/EP2019/069549
§ 371 (c)(1),
(2) Date: Jan. 19, 2021

(87) PCT Pub. No.: WO2020/020787
PCT Pub. Date: Jan. 30, 2020

(65) Prior Publication Data
US 2021/0273510 A1    Sep. 2, 2021

(30) Foreign Application Priority Data
Jul. 25, 2018 (DE) ............ 10 2018 212 431.0

(51) Int. Cl.
*H02K 1/28* (2006.01)
*H02K 1/02* (2006.01)
(Continued)

(52) U.S. Cl.
CPC ........... *H02K 1/28* (2013.01); *H02K 1/02* (2013.01); *H02K 1/2766* (2013.01); *H02K 1/32* (2013.01); *H02K 7/003* (2013.01)

(58) Field of Classification Search
CPC .......... H02K 1/28; H02K 1/02; H02K 1/2766; H02K 1/32; H02K 7/003
(Continued)

(56) References Cited

U.S. PATENT DOCUMENTS 3,997,803 A * 12/1976 Mishra .................. H02K 1/32
310/59
2013/0221772 A1    8/2013 Miyamoto et al.
(Continued)

FOREIGN PATENT DOCUMENTS

| CN | 103 296 808 A | 9/2013 |
| CN | 106 374 653 A | 2/2017 |

(Continued)

OTHER PUBLICATIONS

Machine translation of DE102011006280; Wehlen et al. (Year: 2012).*

(Continued)

*Primary Examiner* — Terrance L Kenerly
(74) *Attorney, Agent, or Firm* — thyssenkrupp North America, LLC

(57) ABSTRACT

A rotor and a method of making such a rotor, wherein the rotor has a shaft, a longitudinal axis, and a rotor packet connected to the shaft at least in torsion-resistant manner. The rotor packet is assembled from individual sheet lamellae, wherein the rotor packet has an opening for receiving the shaft. The shaft is a hollow shaft with a wall, wherein the wall of the shaft has, on its side facing toward the opening, recesses extending in the longitudinal direction. An electric motor, in particular a synchronous or hybrid synchronous machine, including a rotor and a stator, has such a rotor. The recesses are produced by cutting methods, in particular milling, or reshaping methods, in particular pressing.

7 Claims, 4 Drawing Sheets

(51) Int. Cl.
*H02K 1/276* (2022.01)
*H02K 1/32* (2006.01)
*H02K 7/00* (2006.01)

(58) Field of Classification Search
USPC ........................................ 310/216.121, 261.1
See application file for complete search history.

(56) References Cited

U.S. PATENT DOCUMENTS

2015/0171704 A1    6/2015  Borgen
2017/0126082 A1*   5/2017  Kusase .................... H02K 3/28

FOREIGN PATENT DOCUMENTS

| | | |
|---|---|---|
| CN | 206 023 489 U | 3/2017 |
| DE | 40 18 959 A | 1/1991 |
| DE | 10 2004 063 659 A | 2/2006 |
| DE | 10 2009 054 995 A | 6/2011 |
| DE | 102011006280 * 10/2012 | ............. H02K 1/32 |
| DE | 10 2014 216 905 A | 3/2016 |
| DE | 10 2016 118 026 A | 3/2018 |
| EP | 1 300 926 A2 | 4/2003 |
| JP | S 62-198834 U | 12/1987 |
| JP | 2014-057456 A | 3/2014 |
| WO | 2011/147498 A | 12/2011 |

OTHER PUBLICATIONS

English Translation of International Search Report issued in PCT/EP2019/069549, dated Sep. 17, 2019.

* cited by examiner

ROTOR, ELECTRIC MOTOR, METHOD FOR PRODUCING A ROTOR AND USE OF A ROTOR AND ELECTRIC MOTOR

CROSS REFERENCE TO RELATED APPLICATIONS

This application is a U.S. National Stage Entry of International Patent Application Serial Number PCT/EP2019/069549, filed Jul. 19, 2019, which claims priority to German Patent Application No. DE 10 2018 212 431.0, filed Jul. 25, 2018, the entire contents of both of which are incorporated herein by reference.

FIELD

The present disclosure generally relates to a rotor, an electric motor, a method for producing a rotor, and use of a rotor.

BACKGROUND

A rotor, comprising a shaft and a rotor packet mounted on the shaft, is employed, for the most part, in electric motors. The rotor packet is, as a rule, a sheet packet assembled from individual sheet lamellae. The individual sheet lamellae in this case have been arranged in series in the axial direction. But the sheet lamellae as such may also have been assembled from individual sheet-lamella segments which have been arranged and connected in series in the peripheral direction.

The rotor packet is connected to the shaft in torsion-resistant manner. As a rule, this is done by means of press bonding.

Particularly at high speeds, considerable centrifugal forces result which act on the components of the rotor. Problems may arise from this in the case of rotor packets fastened with the aid of press bonding. As a rule, the rotor packets have higher masses in comparison with the shaft, with a likewise larger spacing from the axis of rotation. Furthermore, the rotor packets undergo higher centrifugal forces by reason of their mass distribution which is further removed from the axis of rotation. To this extent, at high speeds the rotor packet threatens to lift away from the shaft, or the effective overlap and hence the torque that is still transmissible decreases.

From DE 10 2014 216905 A1, for instance, a rotor packet with internal thread has become known which is screwed onto a shaft provided with an external thread. Even though this measure may be useful for improving the connection between shaft and rotor packet, nevertheless there is a demand for an improved rotor, in particular for a connection between shaft and rotor packet which constitutes a secure connection even at high speeds. The rotor is preferentially also to be capable of being produced easily.

Thus, a need exists for a rotor where the shaft is a hollow shaft with a wall, the wall of the shaft being configured on its side facing toward the opening with recesses extending in the longitudinal direction, the peripheral rigidity can be reduced. By this means, given the same pressing force a higher compression of the shaft provided with recesses can be obtained in comparison with a normal hollow shaft. The shaft acts as a compressed spring and can traverse the pre-compressed distance in the event of widening of the rotor packet. By virtue of the centrifugal forces also acting on the shaft (albeit lower centrifugal forces than in the case of the rotor packet), a widening of the shaft beyond the normal diameter also occurs.

DETAILED DESCRIPTION

Figure 1:
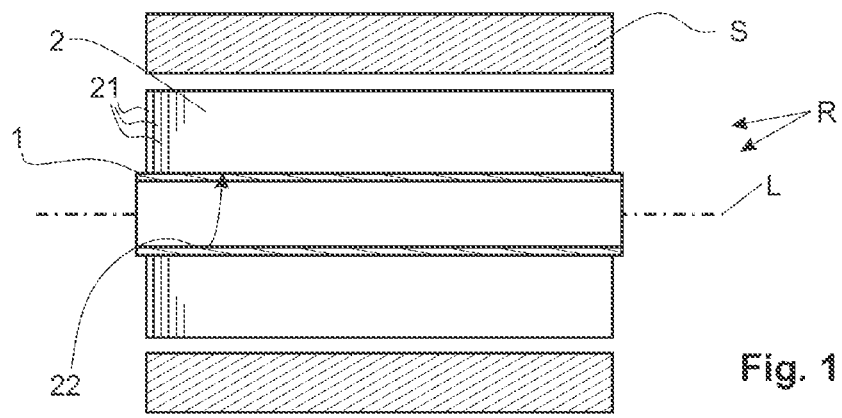
FIG. 1 a schematic cross-sectional view of an electric motor with a rotor.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a rotor, to an electric motor, to a method for producing a rotor, and to a use of a rotor.

In an advantageous configuration of the invention there may be provision that the recesses are oriented parallel to the longitudinal axis of the shaft and/or parallel to one another.

In another advantageous configuration of the invention there may be provision that the recess is configured as an elongated hole in the wall of the hollow shaft. The configuration of the recess as an elongated hole can be produced advantageously from the viewpoint of production engineering, for instance by the elongated hole being milled out of the wall of a hollow shaft. But other production methods are also conceivable.

In another advantageous configuration of the invention there may be provision that the elongated hole extends over a portion of the shaft, in particular over a portion that is received in the opening of the rotor packet. By this means, merely the region that is substantially necessary for the improved connection between shaft and rotor packet is reduced in terms of its peripheral rigidity.

In another advantageous configuration of the invention there may be provision that the recess is configured as a groove. The configuration of the recess as a groove differs from the configuration as an elongated hole substantially by virtue of the fact that the groove exhibits a bottom. A structure of such a type can preferentially be undertaken by a profiling of the wall of the hollow shaft. In this case, the wall preferentially has a constant wall thickness.

Furthermore, if the recesses have been configured as elongated holes or grooves the result is advantageously that the shaft has been configured with contact faces that lie against the inner surface of the opening, the recesses being arranged between the contact faces.

In another advantageous configuration of the invention there may be provision that the shaft has been formed from a magnetically soft material. By the shaft being utilized also as a magnetic conductor, material in the rotor packet can be eliminated.

In another advantageous configuration of the invention there may be provision that the rotor packet exhibits cutouts—in particular, triangular cutouts—which, in particular, directly adjoin the recesses, so that the recesses and cutouts jointly form a contiguous flux barrier in each instance. As a result, the magnetic material can be utilized more effectively, and material in the rotor packet can be eliminated. In particular, regions radially below magnets that are sparsely utilized magnetically have been cut out, so that the weight of the rotor can be reduced.

A further object of the present invention consists in proposing an improved electric motor.

In accordance with the invention, this object is achieved by an electric motor with the characterizing features described herein. By virtue of the fact that the rotor is a rotor proposed in accordance with the invention, an improved connection between the shaft and the rotor packet can be provided which is able to ensure a reliable connection between shaft and rotor packet even at high speeds.

A further object of the present invention consists in proposing an advantageous production method for a rotor according to the invention.

In accordance with the invention, this object is achieved by a method with the characterizing features described herein. By virtue of the fact that the recess or recesses is/are produced by material-separating methods, in particular milling or punching, or reshaping methods, in particular pressing or hammering, the recesses can be produced in a manner that in each instance is advantageous from the viewpoint of production engineering, depending upon which embodiment is chosen for the recess or recesses.

A further object of the present invention consists in proposing an advantageous use of a rotor according to the invention, in particular of an electric motor according to the invention with a rotor according to the invention.

In accordance with the invention, this object is achieved by a use with the characterizing features described herein. By virtue of the fact that the shaft acts as a compressed spring, the shaft can traverse the pre-compressed distance in the event of widening of the rotor packet.

A further object of the present invention consists in proposing an advantageous use of a rotor according to the invention, in particular of an electric motor according to the invention with a rotor according to the invention.

In accordance with the invention, this object is achieved by a use according to the characterizing features described herein. By virtue of the fact that the shaft serves for the conduction of a magnetic flux, in which connection the recesses are utilized as flux barriers for directing this magnetic flux, the recesses can correspondingly be given a multiple function, in particular in function of an improved connection between shaft and rotor packet, and also as flux barriers for directing a magnetic field.

For this purpose the recesses of the shaft may have been realized as grooves or as elongated holes. For this purpose the shaft has, moreover, been formed from magnetically soft material, so that the shaft serves as a magnetic conductor, in particular for the magnetic short-circuiting of two poles of two magnets of a rotor packet exhibiting magnets. As a result, material in the rotor can be eliminated, in particular for the purpose of reducing the rotor yoke.

The rotor packet preferentially exhibits further flux barriers in the form of cutouts—in particular, substantially triangular cutouts. These cutouts directly adjoin the recesses, so that the recesses and cutouts form a contiguous flux barrier in each instance. As a result, further material in the rotor packet can be eliminated.

The number of recesses preferentially amounts to an integral multiple n (n=1, 2, 3, . . . ) of the number of poles; particularly preferably, the numbers of recesses and poles are equal (n=1).

A further object of the present invention consists in proposing an advantageous use of a rotor according to the invention, in particular of an electric motor according to the invention with a rotor according to the invention.

In accordance with the invention, this object is achieved by a use according to the characterizing features described herein. By virtue of the fact that the recesses are subjected to the action of a cooling medium, an effective cooling of the rotor can be undertaken. In addition, the recesses can be given the functions already outlined above, so that, for instance, three functions have been combined in one recess, this in turn being able to contribute to a compact style of construction of the rotor or electric motor.

Reference will firstly be made to FIG. 1.

A rotor R according to the invention substantially comprises a shaft 1 and a rotor packet 2.

The rotor packet 2 is mounted on the shaft 1 in torsion-resistant manner, but preferentially also in axially fixed manner.

The shaft 1 is a hollow shaft with a corresponding wall 11. The shaft 1 has a corresponding longitudinal axis or axis of rotation L.

The rotor packet 2 exhibits at least one, preferentially several, annular sheet lamellae 21 which have been assembled to form a hollow cylindrical rotor packet 2. Correspondingly, the sheet lamellae 21 have been lined up in series in the axial direction. But the sheet lamellae 21 as such may also have been assembled from individual sheet-lamella segments (not represented) which have been arranged and connected in series in the peripheral direction.

The rotor packet 2 exhibits an opening 22, through which the shaft 1 has been passed or in which the shaft 1 is received. This opening 22 exhibits a surface facing toward the shaft, which will be designated below as the inner surface.

The shaft 1 or the wall 11 thereof exhibits correspondingly a surface facing toward the opening 22.

In accordance with the invention there is provision that the surface of the shaft 1 facing toward the inner surface of the opening 22 has been provided with recesses 12 extending in the longitudinal direction L. The recesses 12 are preferentially oriented parallel to the longitudinal axis L of the shaft 1 and/or parallel to one another.

Figures 6A, 6B:
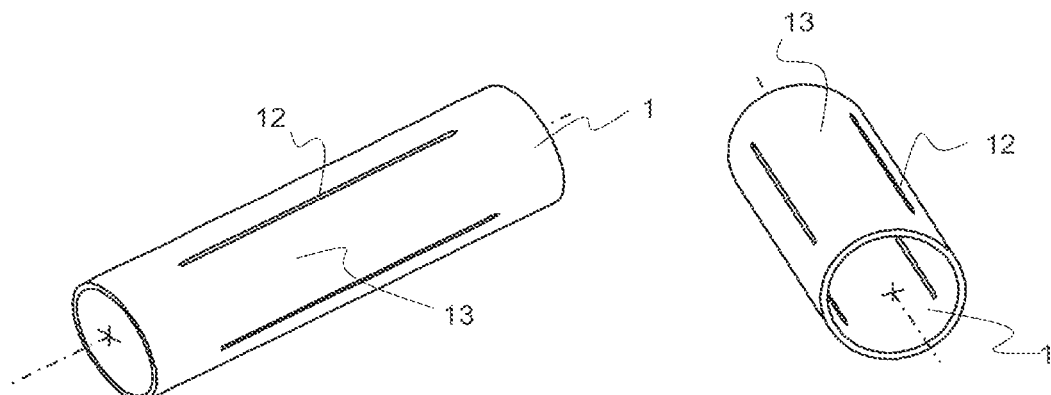
FIG. 6*a* is a first perspective view of a further embodiment of a shaft for a rotor.
FIG. 6*b* is another perspective view of an embodiment of a shaft according to FIG. 6*a* for a rotor.
Figure 7:
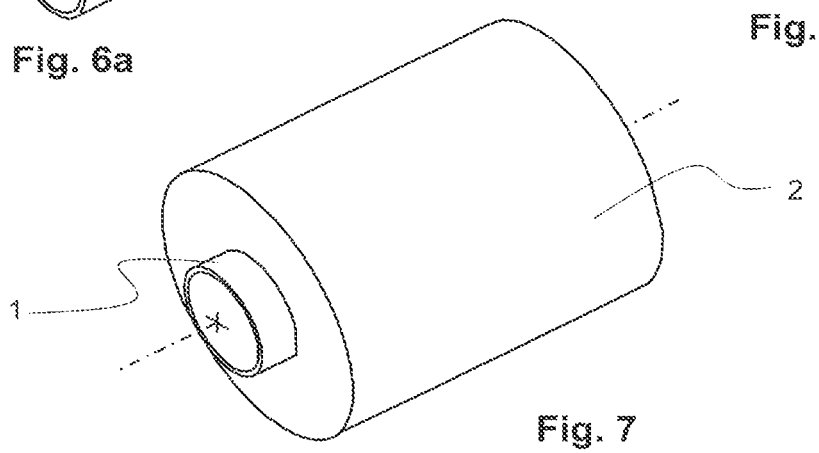
FIG. 7 is a perspective view of a rotor with a shaft according to FIG. 6*a* or 6*b*.

In a first embodiment, which, for instance, is represented in the images FIG. 6, the recesses 12 may have been configured as elongated holes in the wall 11 of the hollow shaft. The elongated hole 12 preferentially penetrates the wall 11 completely and is preferentially produced by material-separating methods such as milling or punching, for instance. To this extent, the recesses 12 of this embodiment preferentially do not extend over the entire length of the shaft 1 but, as a rule, extend over the part of the shaft 1 that is located in the opening 22 of the rotor packet 2. Alternatively, there may also be provision that the elongated holes 12 are open on one side. All the one-sided openings of the elongated holes may have been arranged on one side of the shaft 1 but may also have been arranged in alternating manner or in a pattern alternating with respect to the side of the shaft 1.

In a further embodiment, the wall 11 may have been configured in profiled manner—that is to say, the recesses 12 have been configured as grooves. The groove 12 correspondingly exhibits a groove bottom—that is to say, in contrast to the elongated holes the groove 12 does not penetrate the wall 11 completely. The groove or the profiling is preferentially produced by means of reshaping methods such as pressing, for instance.

In both embodiments, contact faces 13 between the recesses 12 of the shaft 1 ultimately result that lie against the inner surface of the opening 22. These contact faces 13 are preferentially separated from one another in the peripheral direction by the recesses 12.

As a result, a rotor shaft 1 having reduced peripheral rigidity is proposed, onto which a rotor packet 2 has been directly pressed. The reduction of the peripheral rigidity can be effected by virtue of recesses 12, for instance in the form of elongated holes and/or grooves which have been introduced.

Figures 2A, 2B:
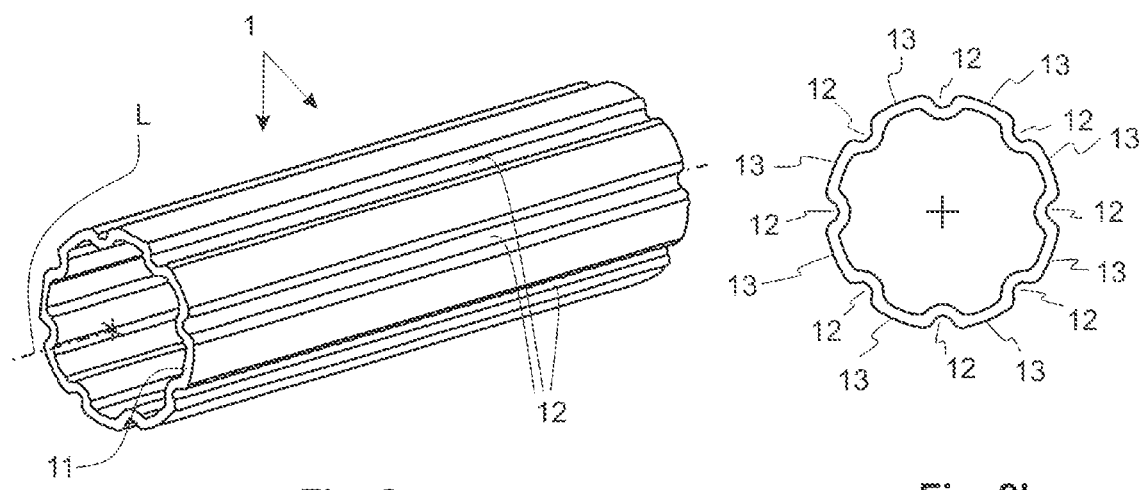
FIG. 2*a* is a perspective view of a shaft of a rotor.
FIG. 2*b* is a top view of a shaft of a rotor.
Figure 3:
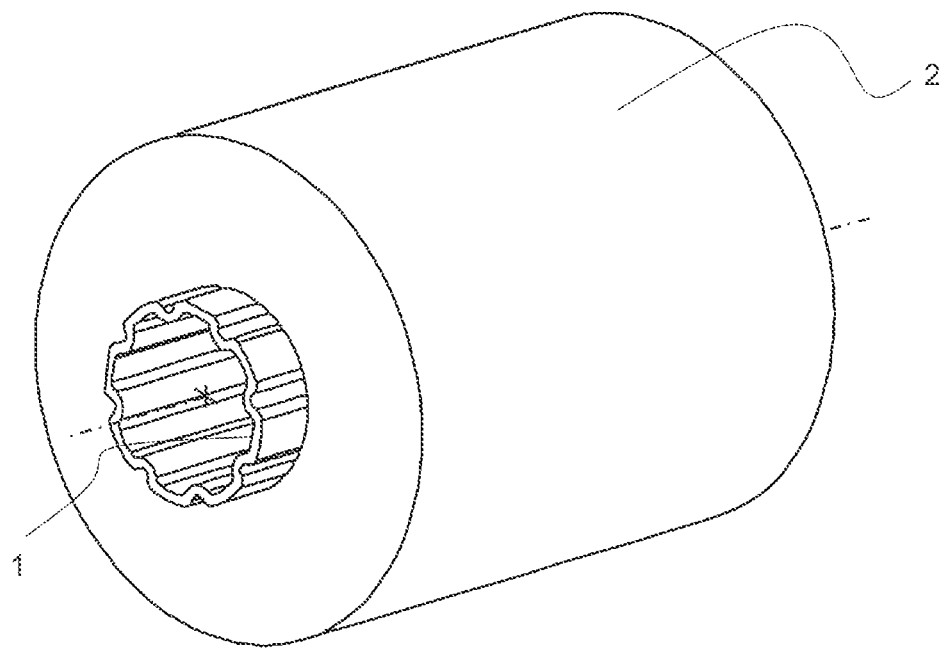
FIG. 3 is a perspective view of a rotor.
Figure 4:
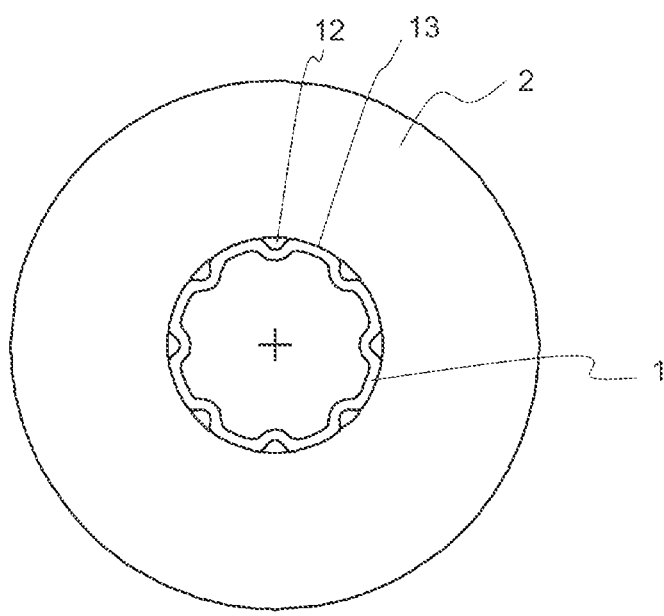
FIG. 4 is a front view of a rotor.
Figure 5:
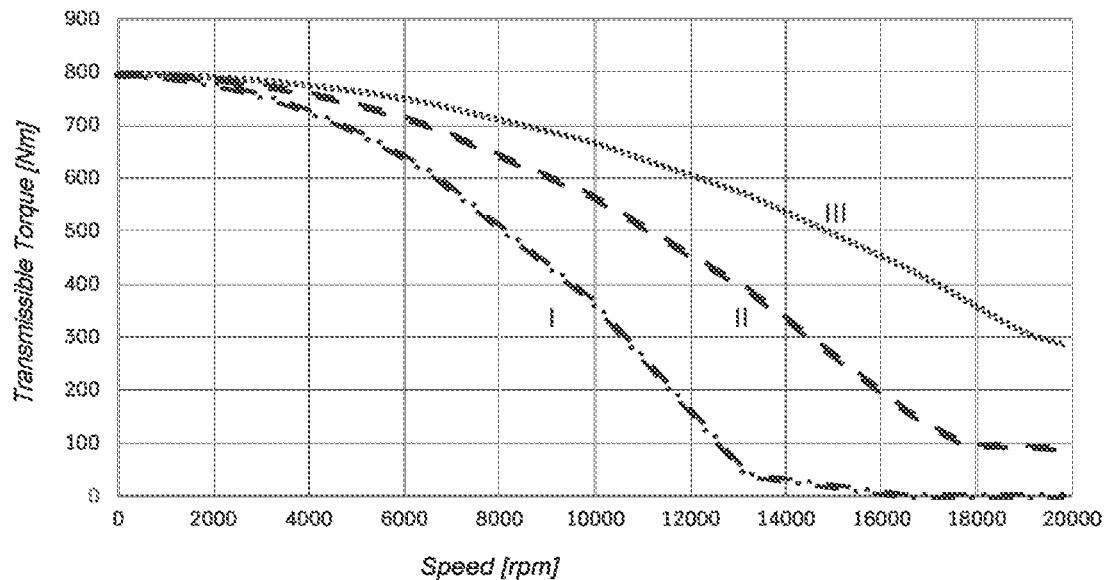
FIG. 5 is a graph of an exemplary comparison of the transmissible torque as a function of speed for various rotor-packet/shaft constellations.

For the purpose of clarifying this effect, transmissible torque has been plotted over rotor speed in FIG. 5 in respect of various examples. Numeral I refers to an unprofiled hollow shaft; numeral II refers to a hollow shaft with four grooves as recesses; and numeral III refers to a hollow shaft with eight grooves as recesses (FIGS. 2 to 4).

Figure 8:
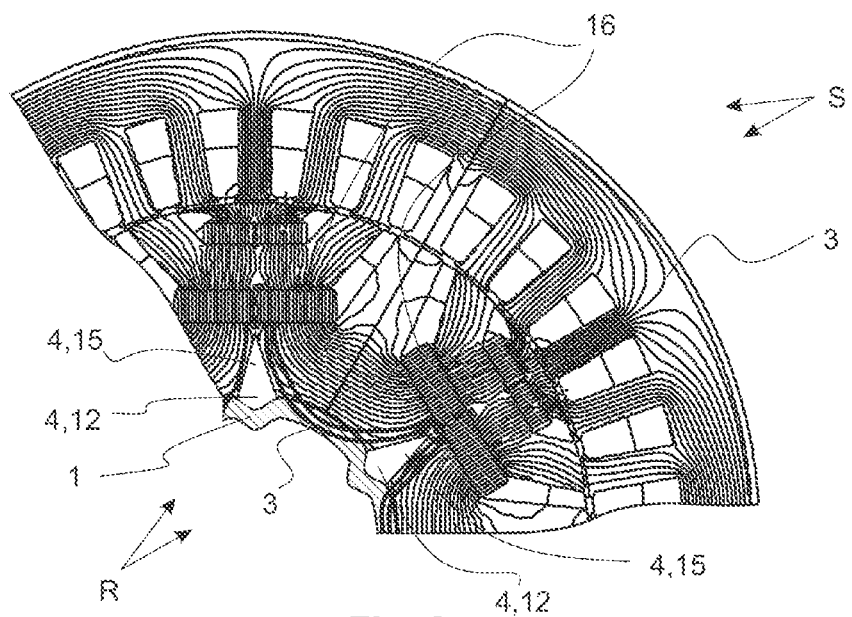
FIG. 8 is a schematic view of lines of magnetic flux in a rotor.
Figure 9:
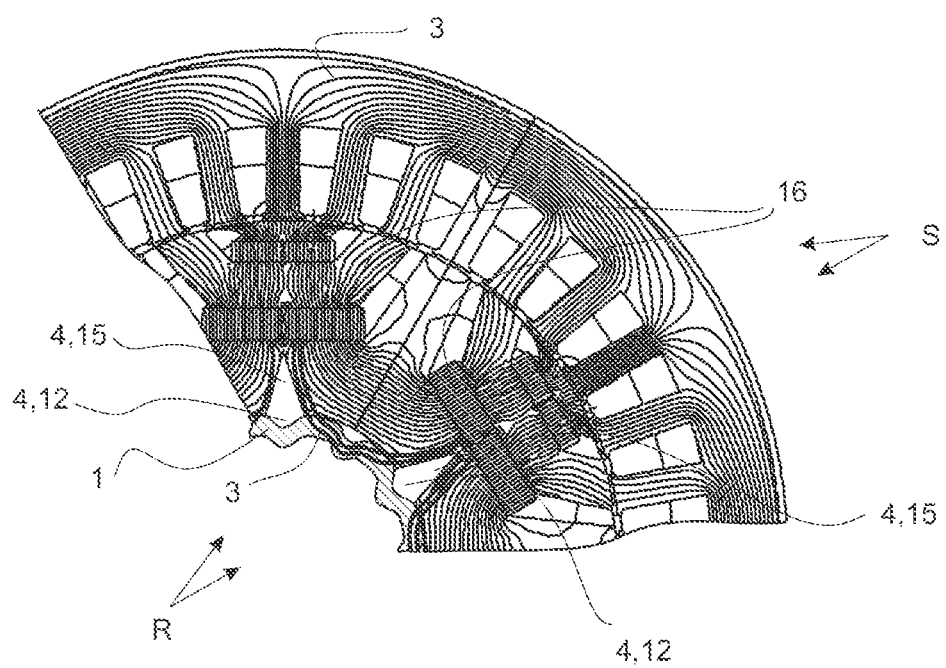
FIG. 9 is a schematic view of lines of magnetic flux in a rotor.

In a further development of the invention, or with regard to an advantageous use, the recesses 12 may at the same time be utilized as flux barriers for directing a magnetic field, especially in the case of synchronous or hybrid synchronous machines. The number of recesses 12 advantageously amounts to an integral multiple n (n=1, 2, 3 . . . ) of the number of poles. For the purpose of Illustrating this effect, lines of magnetic flux 3 and the recesses 12 acting as flux barrier 4 are represented in FIG. 8 (with equal numbers of poles and recesses—that is to say, n=1) and FIG. 9 (with twice the number of recesses—that is to say, n=2).

For this purpose the shaft 1 has been formed from magnetically soft material, so that a magnetic path leads through one or more elevations 13 of the shaft. By this means, the shaft short-circuits, in each instance, two poles of two magnets 16. By the shaft 1 being utilized also as a magnetic conductor, material in the rotor packet 2 can be eliminated.

The rotor packet exhibits further flux barriers in the form of cutouts 15—here, substantially triangular cutouts 15. These cutouts 15 directly adjoin the recesses 12, so that the recesses 12 and cutouts 15 jointly form a contiguous flux barrier 4 in each instance. As a result, the magnetic material can be utilized more effectively, and material in the rotor packet 2 can be eliminated. In particular, regions radially below magnets 16 that are sparsely utilized magnetically have been cut out, so that the weight of the rotor can be reduced.

In a further development of the invention, or with regard to an advantageous use, the recesses 12 may also serve as ducts for a cooling medium which may come into direct contact with the rotor packet.

Features and details that have been described in connection with the method also apply, of course, in connection with the rotor or electric motor according to the invention, and conversely, so that, with respect to the disclosure, reference to the individual aspects of the invention is always made or can always be made reciprocally. In addition, the method according to the invention can be carried out with the rotor or electric motor according to the invention.

The following reference symbols are used in the images:
S stator
R rotor
L longitudinal axis/axis of rotation
1 shaft
2 rotor packet
3 lines of magnetic flux
4 flux barrier
11 wall/surface
12 recess
13 contact face
15 cutout
16 magnet
21 sheet lamellae
22 opening/inner surface

What is claimed is:

1. A rotor, comprising
a shaft with a longitudinal axis, and
a rotor packet connected to the shaft at least in a torsion-resistant manner,
wherein the rotor packet comprises individual sheet lamellae,
wherein the rotor packet comprises an opening sized and shaped to receive the shaft,
wherein the shaft is a hollow shaft with a wall, wherein the wall of the shaft comprises, on its side facing toward the opening, recesses extending in the longitudinal direction, and wherein each of the recesses is an elongated hole through the wall of the shaft, wherein the elongated hole penetrates radially through the wall of the shaft from an outermost wall to an innermost wall.

2. The rotor of claim 1 wherein the recesses are oriented parallel to the longitudinal axis of the shaft and/or parallel to one another.

3. The rotor of claim 1 wherein the shaft comprises contact faces that lie against the inner surface of the opening, individual ones of the recesses being arranged between respective contact faces.

4. The rotor of claim 1 wherein the shaft is formed from a magnetically soft material.

5. The rotor of claim 1 wherein the rotor packet exhibits cutouts which directly adjoin the recesses so that the recesses and cutouts jointly form a contiguous flux barrier in each instance.

6. An electric motor comprising a rotor and a stator, wherein the rotor comprises a shaft with a longitudinal axis and a rotor packet connected to the shaft at least in a torsion-resistant manner, wherein the rotor packet comprises individual sheet lamellae, wherein the rotor packet comprises an opening sized and shaped to receive the shaft, and wherein the shaft is a hollow shaft with a wall, wherein the wall of the shaft comprises, on its side facing toward the opening, recesses extending in the longitudinal direction, wherein each of the recesses is an elongated hole through the wall of the shaft, wherein the elongated hole penetrates radially through the wall of the shaft from an outermost wall to an innermost wall.

7. A method for producing a rotor, the rotor comprising a shaft with a longitudinal axis and a rotor packet connected to the shaft at least in a torsion-resistant manner, wherein the rotor packet comprises individual sheet lamellae, wherein the rotor packet comprises an opening sized and shaped to receive the shaft, and wherein the shaft is a hollow shaft with a wall, wherein the wall of the shaft comprises, on its side facing toward the opening, recesses extending in the longitudinal direction, the method comprising:

produbing the recesses by material-separating methods or reshaping methods wherein each of the recesses is an elongated hole through the wall of the shaft, wherein the elongated hole penetrates radially through the wall of the shaft from an outermost wall to an innermost wall.

* * * * *